United States Patent [19]
McMahan

[11] Patent Number: 5,784,713
[45] Date of Patent: Jul. 21, 1998

[54] ADDRESS CALCULATION LOGIC INCLUDING LIMIT CHECKING USING CARRY OUT TO FLAG LIMIT VIOLATION

[75] Inventor: Steven C. McMahan, Richardson, Tex.

[73] Assignee: Cyrix Corporation, Richardson, Tex.

[21] Appl. No.: 27,054

[22] Filed: Mar. 5, 1993

[51] Int. Cl.$^6$ .................................................. G06F 12/00
[52] U.S. Cl. ............................... 711/220; 711/201
[58] Field of Search ........................ 395/400, 425, 395/411, 421.1; 364/200 MS File, 900 MS File, DIG. 1, DIG. 2; 711/201, 220

[56] References Cited

U.S. PATENT DOCUMENTS

| | | | |
|---|---|---|---|
| 4,837,738 | 6/1989 | Lemay et al. | 711/220 |
| 4,851,989 | 7/1989 | Kagimasa et al. | 711/206 |
| 5,408,626 | 4/1995 | Dixit | 711/220 |

*Primary Examiner*—Jack A. Lane
*Attorney, Agent, or Firm*—Andrew S. Viger; John L. Maxin

[57] ABSTRACT

Address calculation logic in which an adder carry out flags a segment limit violation is used, in an exemplary embodiment, in a 486 type microprocessor. An effective address adder (24) and a three input adder (26) comprise limit checking logic. The three input adder receives on offset (EA[31:0]) and two limit-checking components: the memory reference fetch size and, for the exemplary embodiment, a converted segment limit. Specifically, the segment limit from a segment descriptor is converted such that, for either expand up or expand down segments, when the offset is added to this converted segment limit and (in the case of expand up segments) the fetch size in the three input adder, a limit violation is flagged by the carry out bit of a three input adder. In the exemplary embodiment, the segment is converted at segment load and stored on-chip in a segment descriptor register.

12 Claims, 2 Drawing Sheets

5,784,713

ADDRESS CALCULATION LOGIC INCLUDING LIMIT CHECKING USING CARRY OUT TO FLAG LIMIT VIOLATION

TECHNICAL FIELD OF THE INVENTION

The invention relates generally to microprocessors, and more particularly relates to address calculation logic including limit checking logic that uses a carry out indication to flag a limit violation. In an exemplary embodiment, the address calculation logic is used in a 486 type 32 bit microprocessor.

RELATED APPLICATION

This application is related to a co-pending U.S. patent application Ser. No. 08/026,855, titled "Address Calculation Logic Including Three Input Adder With Carry Squashing To Support 16/32 Bit Addressing", filed Mar. 5, 1993, now abandoned, and assigned to the assignee of this application.

BACKGROUND OF THE INVENTION

The x86 microprocessor family includes the 16 bit 8086 and 80286 architectures, and the 32 bit 80386 and 80486 architectures. The later generation 386/486 architectures support three different execution modes: real, virtual 86, and protected.

In each of these execution modes, addressable memory is organized in segments of logically associated instructions/data—the real and virtual 86 execution modes are used to emulate 8086 segmentation which uses a formula-based address calculation method, while protected mode uses a 286/386/486 segmentation which depends on segment descriptor tables set up in memory by the operating system (in addition, the 386/486 architectures implement paging in protected mode). In both segmentation schemes, a linear address is calculated by adding a segment base address component and an offset address component. The offset address, also referred to as an effective (or virtual) address, is itself calculated as the sum of up to three components: base (or relative base), index (scaled or unscaled), and displacement.

In the case of protected mode segmentation, a segment selector stored in one of the segment registers (code, data, stack, etc.) provides an index to a particular segment selector stored in the segment descriptor table in memory. In the 386/486 architecture, a segment descriptor is an 8 byte value that defines a segment in terms of a segment base, a segment limit, and access control (privilege level, segment type, etc.) information. Parenthetically, in the case of the formula-based 8086 segmentation, each segment is limited to 64Kbytes.

For each segment selector loaded into a segment register, the corresponding segment descriptor is cached on-chip, and accessed during address calculations. In particular, for protected mode segmentation, generating a linear address in response to a memory reference involves two concurrent operations: (a) a linear address calculation in which the segment base is added to the effective address components, and (b) a limit check in which the effective address (offset) is compared to the segment limit and a limit violation is flagged if the offset will result in an address outside of the segment.

Without limiting the scope of the invention, this background information is provided in the context of a specific problem to which the invention has application: in a 486 type microprocessor, reducing the complexity of the logic required to perform limit checking. Limit checking is performed in both 8086 and protected mode segmentation, although in the case of 8086 segmentation the segment limit is fixed—the following discussion is directed to protected mode segmentation where the segment limit is definable using the segment descriptor.

Segments can be defined as either expand up or expand down—for expand up segments, the segment limit is the upper bound of the segment, while for expand down segments the limit is the lower bound of the segment. A segment is defined as expand up or down by a segment type field in the segment descriptor. Expand down segments are generally only used for stack segments, while expand up segments are generally used for code and data segments.

Depending on the type of segment, a segment limit violation is defined as follows:

| | |
|---|---|
| Expand Up | offset + fsize − 1 <= limit |
| Expand Down | offset > limit | where offset is the effective address, and fsize is the fetch size (1, 2, or 4 bytes) for the memory access. Thus, in the case of expand up segments, limit checking is a function of offset and two limit-checking components—fetch size and limit—and a limit violation will occur if the offset address is within the segment (i.e., segment base plus offset does not exceed the segment limit) but the memory access will fetch bytes outside the segment.

A conventional approach to performing limit checking in the case of expand up segments is to first add the offset to fsize, and then subtract the limit—a limit violation is signaled if the subtraction result is greater than or equal to zero. Limit checking for expand down segments does not require the initial addition operation.

The disadvantage with this approach is that, for expand up segments, the limit check requires two adder operations. The design goal is to complete limit checking (and concurrently, address calculation) in a single clock cycle, and having to complete two adder operations makes this problematic, especially at higher core clock rates.

Accordingly, a specific object of the invention is to provide an improved technique for performing the limit checking operation that can be completed in a single adder operation.

SUMMARY OF THE INVENTION

The invention is address calculation logic including limit checking using an adder carry out to flag a segment limit violation. For a given segment defined by a segment base and a segment limit, a segment limit violation occurs when an offset value is of sufficient magnitude in relation to two limit-checking components—the fetch size and the segment limit—that the corresponding address is deemed to be outside the segment (such offset being termed a limit-violation offset).

In one aspect of the invention, limit checking is performed using conversion logic that, for each segment, converts at least one limit-checking component to a converted limit-checking component that, when added to a limit-violation offset, results in a carry out. For each address generation operation, an adder performs limit checking by adding a corresponding offset to the converted limit-checking component. In those cases where the offset is a limit-violation offset, the adder carry out flags a limit violation.

In an exemplary embodiment used in a 486 type microprocessor, segments are either expand up or expand down, and a limit violation is defined by the following relationships:

| | |
|---|---|
| Expand Up | offset + fsize − 1 <= limit |
| Expand Down | offset > limit | where fsize is the corresponding fetch size.

The segment limit is converted, at segment load, into converted segment limits according to:

| | |
|---|---|
| Expand Up | offset + fsize + (-limit − 2) <= −1 |
| Expand Down | offset − limit − 1 >= 0 |

These converted segment limits are stored in the segment descriptor registers in place of the limit, for retrieval during limit checking operations. Alternatively, the fetch size could be converted on the fly for expand up segments.

The technical advantages of the invention include the following. The limit checking technique converts either the segment limit or fetch size limit-checking components to a form that, when added to the offset value and the non-converted component, will cause an adder carry out. This carry out is used to flag a limit violation in only one logic operation, thereby facilitating performing limit-checking in a single clock cycle.

For a more complete understanding of the invention, and for further features and advantages, reference is now made to the Detailed Description of an exemplary embodiment of the invention, together with the accompanying Drawings, it being understood that the invention encompasses any modifications or alternative embodiments that fall within the scope of the claims.

DETAILED DESCRIPTION OF THE INVENTION

The exemplary embodiment of the address calculation logic including limit checking using a carry out signal to flag a segment limit violation is organized as follows:

1. Address Calculation Logic Including Limit Checking
2. Limit Checking
2.1. Segment Limit Conversion
2.2. Limit Checking
3. Conclusion This organizational outline, and the corresponding headings used in this Detailed Description, are provided for convenience of reference only.

The exemplary address calculation logic including limit checking is used in a 486 type microprocessor that supports real mode, protected mode, and virtual 86 mode addressing—the limit checking logic is included in the execution unit where it is also used for ALU operations.

Detailed descriptions of conventional or known aspects of microprocessor systems are omitted so as to not obscure the description of the invention with unnecessary detail. In particular, certain terminology related to the x86 computer architecture (such as execution modes, signal nomenclature, etc.) is known to practitioners in the field of microprocessor design and will not be explained at length in this Detailed Description. The headings used in this Detailed Description, are provided for convenience of reference only.

Address Calculation Logic Including Limit Checking

Figure 1:
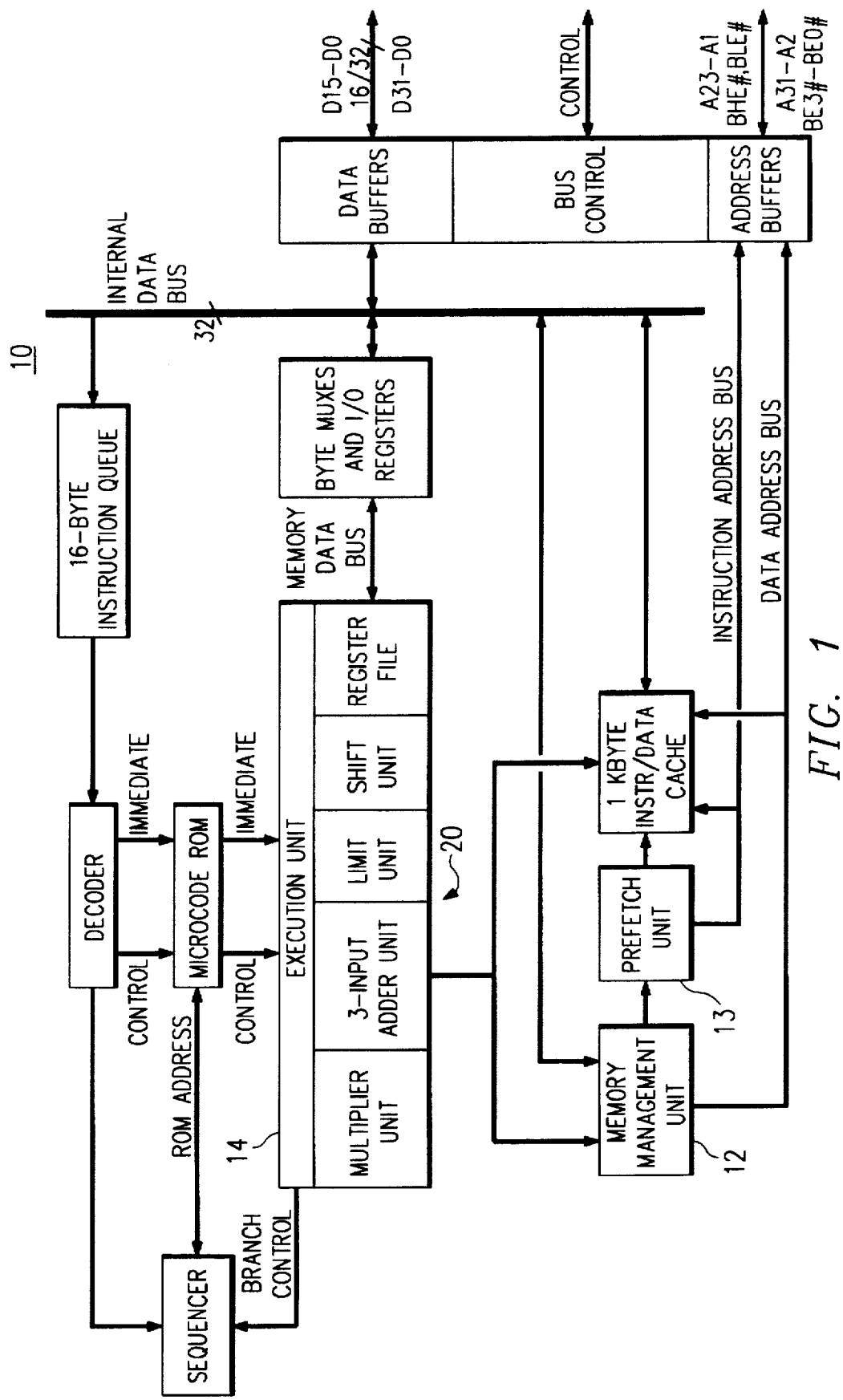
FIG. 1 illustrates a microprocessor including an execution unit, which contains the address calculation logic of the invention.

FIG. 1 illustrates the exemplary microprocessor 10, including address generation logic 12 and an execution unit 14. The microprocessor 10 is a 486 type 32 bit architecture in which the internal data paths and registers are 32 bits wide.

The execution unit includes addition logic 20. For the exemplary embodiment, addition logic 20 includes a number of adders that, in addition to performing normal ALU operations, perform address calculation and limit checking operations for the address generation logic 12. The address generation logic 12 in combination with the addition logic 16 in the execution unit 14 is operable to generate addresses in any of the conventional x86 execution modes—real, protected, and virtual 86—using either 16 or 32 bit addressing, as appropriate.

Figure 2:
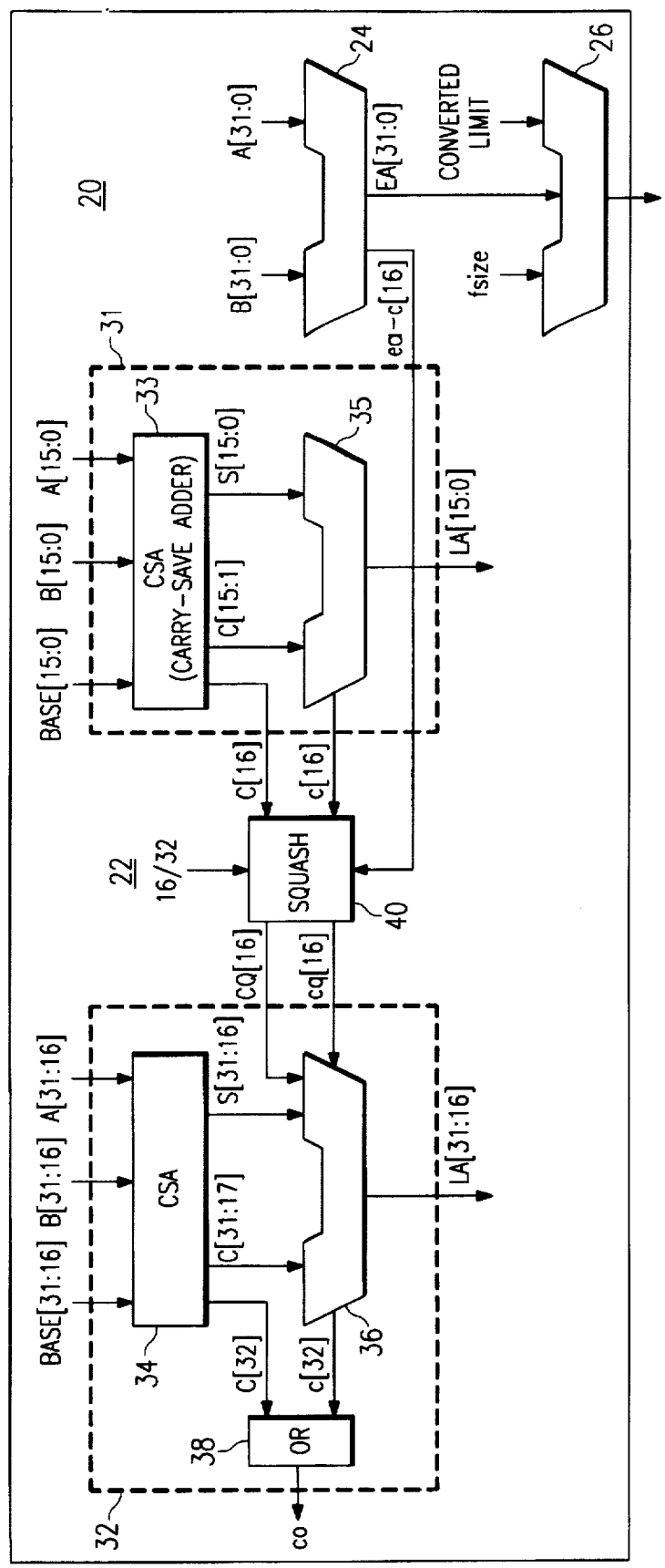
FIG. 2 illustrates the address calculation logic including the limit checking logic of the invention.

FIG. 2 illustrates the portion of the adder logic 20 that is used for linear address calculation and limit checking, including a three input adder 22, a two input effective address adder 24, and another three input adder 26. The three input adder 22 and the effective address adder 24 are used in linear address calculation as described in the Related Application.

Limit Checking Logic

The effective address adder 24 and the three input adder 26 comprise limit checking logic for performing limit checking, including using a carry out to flag limit violations according to this invention. Limit checking is performed in parallel with the linear address calculation.

As described in the Background, and as further described in the Related Application, a linear address is calculated by adding a segment base address component and an offset or effective address component. The offset address is calculated as the sum of up to three components: base (or relative base), index (scaled or unscaled), and displacement.

Typically, the effective address is formed by one or two components: the base component alone, or the base component plus one additional component (scaled index or displacement). For this typical case, the linear address calculation and limit checking are performed in a single pass, which takes a single clock cycle. For the special case where the effective address is formed using all three components, two of the effective address components are combined in an initial pass through three input adder 22 (the segment base input being zero), and then linear address calculation and limit checking are performed in a second pass through the address calculation and limit checking logic using the resulting two effective address components and the segment base component. The following discussion assumes that the effective address is formed by two components, one of which may be the combination of two components resulting from an initial pass through the address calculation logic.

For each limit checking operation, the two effective address components A[31:0] and B[31:0] are input to the effective address adder 24, which outputs the effective address or offset EA[31:0]. For the exemplary embodiment, this adder is a Ling-type adder.

The offset EA[31:0] is input to the three input adder 26. This adder also receives two limit-checking components: the memory reference fetch size and, in accordance with the exemplary embodiment of this invention, a converted segment limit value.

Segment Limit Conversion

As described in the Background, for the 386/486 architecture, segment limit violations are defined for both segment types as follows:

| Expand Up | offset + fsize − 1 <= limit |
|---|---|
| Expand Down | offset > limit | where offset is the effective address output EA[31:0] from the effective address adder 24, and fsize is the fetch size (1, 2, or 4 bytes) for the current memory access. Thus, in the case of expand up segments, a limit violation will occur if the offset address is within the segment (i.e., segment base plus offset does not exceed the segment limit) but the memory access will fetch bytes outside the segment.

Completing a limit check in a single logic operation is straightforward in the case of expand down segments, but cannot be performed for expand up segments because of the requirement of taking into account the fetch size. The limit checking technique of the invention is to convert one of the limit check components—either the fetch size or the segment limit—into a converted limit-checking component such that when the offset is added to this converted limit checking component and the other component, a limit violation can be flagged using the carry out bit of a three input adder.

For the exemplary embodiment, the segment limit is converted into a converted segment limit component. Rearranging the above equations for expand up/down segment limit violations yields:

| Expand Up | offset + fsize + (-limit − 2) <= −1 |
|---|---|
| Expand Down | offset + (-limit − 1) >= 0 |

Thus, in the case of expand up segments, a carry out (i.e., −1) will indicate a limit violation, while in the case of expand down segments, the absence of carry out (i.e., 0) will indicate a limit violation. Of course, these two conditions are interchangeable between expand up/down—the use of carry out in connection with flagging a limit violation should be understood to refer to either condition.

Thus, for the exemplary embodiment, the carry out from adder 26 will indicate that a segment limit violation has occurred if the converted limit checking component input to the adder is: (a) in the case of an expand up segment, (−limit−2), and (b) in the case of an expand down segment, (−limit−1). Accordingly, to implement the limit checking technique of the invention, for each segment, the segment limit is converted to a converted segment limit: (a) in the case of expand up segments, (−limit−2), and (b) in the case of expand down segments, (−limit−1).

Limit Checking

For the exemplary embodiment, segment limit conversion is performed at segment load. The converted segment limit is stored on-chip in the segment descriptor register, in place of the segment limit value stored in the segment descriptor table.

Limit checking is performed in a single cycle operation through the three input adder 26. For expand up segments, the adder receives the offset EA[31:0] from the effective address adder 24, the fetch size, and the converted segment limit (−limit−2)—a limit violation will be flagged by a carry out. For expand down segments, the adder receives the offset and the converted segment limit (−limit−1)—a limit violation will be flagged by the absence of carry out.

If fetch size were to be selected as the limit-checking component to be converted, the recommended approach would be to convert the fetch size on the fly prior to input to the three input adder—because of the limited number of fetch size values in the exemplary 386/486 architecture (1, 2, or 4 bytes), the logic to accomplish this real time conversion is not overly complex.

Conclusion

Although the Detailed Description of the invention has been directed to certain exemplary embodiments, various modifications of these embodiments, as well as alternative embodiments, will be suggested to those skilled in the art. For example, the procedure for providing the converted limit-checking component, including the choice of whether to use segment limits or fetch sizes, is an implementation design choice. Various modifications based on trade-offs between hardware and software logic will be apparent to those skilled in the art. Also, the specific address nomenclature (linear address, effective address, segment base, relative base, etc.) is conventional for the x86 architecture, and is used for the purpose of describing the exemplary embodiment only.

The invention encompasses any modifications or alternative embodiments that fall within the scope of the claims.

What is claimed is:

1. Address calculation logic that performs address calculation operations including limit checking using a carry out signal to flag a segment limit violation, where for a given segment defined by a segment base and a segment limit, and for a given fetch size, a segment limit violation occurs when an offset address is deemed to be outside the segment (such offset being termed a limit-violation offset), comprising:

address calculation logic that receives offset addresses and two limit-checking components, fetch size and segment limit;

the address calculation logic including conversion logic that, for each segment, converts at least one of the limit-checking components to a converted limit-checking component such that adding at least the converted limit-checking component to a limit-violation offset results in a carry out flag; and the address calculation logic including an adder that, for each address calculation operation, adds in a single addition operation a corresponding offset address to at least the converted limit-checking component;

such that, in those cases where the offset address is a limit-violation offset, the adder carry out flag signals a limit violation.

2. The address calculation logic of claim 1, wherein the converted segment limit-checking component is the limit.

3. The address calculation logic of claim 2, wherein the conversion logic comprises logic for converting the segment limit during segment load and storing the converted segment limit in a segment descriptor register.

4. The address calculation logic of claim 2, wherein the segments are either expand up and expand down, and the corresponding converted segment limits are respectively (−limit−2) and (−limit−1), such that limit checking is characterized by:

| Expand Up | offset + fsize + (-limit − 2) <= −1 |
|---|---|
| [Expand Down | offset − limit − 1 >= 0] |
| Expand Down | offset + (-limit − 1) >= 0 | where fsize is the corresponding fetch size.

5. A method of performing segment limit checking during address calculation operations where, for a given segment defined by a segment base and a segment limit, and for a given fetch size, a segment limit violation occurs when an offset address is deemed to be outside the segment (such offset being termed a limit-violation offset), comprising the steps:

for an address calculation, receiving an offset address and two limit-checking components, fetch size and segment limit;

for each segment, converting at least one limit checking component to a converted limit-checking component that, when added at least to a limit-violation offset, results in a carry out flag; and for each address calculation operation, adding in a single addition operation a corresponding offset address to at least the converted limit-checking component;

such that, in those cases where the offset address is a limit-violation offset, the carry out flag from the addition operation signals a limit violation.

6. The method of performing segment limit checking of claim 5, wherein the converted limit-checking component is the segment limit.

7. The method of performing segment limit checking of claim 6, wherein the step of converting the segment limit to a converted segment limit is accomplished by converting the segment limit during segment load, and then storing the converted segment limit in a segment descriptor register.

8. The address calculation logic of claim 6, wherein the segments are either expand up and expand down, and the corresponding converted segment limits are respectively (−limit−2) and (−limit−1), such that limit checking is characterized by:

| Expand Up | offset + fsize + (-limit − 2) <= −1 |
| [Expand Down | offset − limit − 1       >= 0] |
| Expand Down | offset       + (-limit − 1) >= 0 | where fsize is the corresponding fetch size.

9. A microprocessor in which address calculation operations includes limit checking using a carry out signal to flag a segment limit violation, where for a given segment defined by a segment base and a segment limit, and for a given fetch size, a segment limit violation occurs when an offset address is deemed to be outside the segment (such offset being termed a limit-violation offset), comprising:

address calculation means for receiving offset addresses and two limit-checking components, fetch size and segment limit;

the address calculation means including conversion means for converting, for each segment, at least one of the limit-checking components to a converted limit-checking component such that adding at least the converted limit-checking component to a limit-violation offset results in a carry out flag; and the address calculation means including adder means for adding, during each address calculation operation, in a single addition operation a corresponding offset to at least the converted limit-checking component such that, in those cases where the offset address is a limit-violation offset, the adder carry out flag signals a limit violation.

10. The microprocessor of claim 9, wherein the converted limit-checking component comprises the segment limit.

11. The microprocessor of claim 10, wherein the conversion means comprises means for converting the segment limit during segment load and storing the converted segment limit in a segment descriptor register.

12. The microprocessor of claim 10, wherein the segments are either expand up and expand down, and the corresponding converted segment limits are respectively (−limit−2) and (−limit−1), such that limit checking is characterized by::

| Expand Up | offset + fsize + (− limit − 2) <= −1 |
| [Expand Down | offset − limit − 1       >= 0] |
| Expand Down | offset       + (-limit − 1) >= 0 | where fsize is the corresponding fetch size.

* * * * *